US008875189B2

(12) United States Patent
Chung et al.

(10) Patent No.: US 8,875,189 B2
(45) Date of Patent: Oct. 28, 2014

(54) APPARATUS AND METHOD FOR MANAGING VARIABLE MULTICAST AND BROADCAST SERVICE ZONES IN MBS SERVER

(71) Applicant: Electronics and Telecommunications Research Institute, Daejeon (KR)

(72) Inventors: Yeon-Joon Chung, Daejeon-si (KR); Young-Il Kim, Daejeon-si (KR); Young-Soo Park, Daejeon-si (KR); Sung-Hee Kim, Daejeon-si (KR); Cheol-Hye Cho, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/898,057

(22) Filed: May 20, 2013

(65) Prior Publication Data
US 2014/0013360 A1 Jan. 9, 2014

(30) Foreign Application Priority Data
Jul. 5, 2012 (KR) .................. 10-2012-0073540

(51) Int. Cl.
*H04N 7/16* (2011.01)
*H04W 36/00* (2009.01)
*H04W 72/00* (2009.01)
*H04N 21/61* (2011.01)
*H04N 21/414* (2011.01)
*H04N 7/173* (2011.01)
*H04H 20/71* (2008.01)
*H04W 4/00* (2009.01)

(52) U.S. Cl.
CPC ..... *H04N 21/6131* (2013.01); *H04N 21/41407* (2013.01)

USPC ............. 725/62; 725/109; 455/436; 455/437; 455/438; 455/439; 455/440; 455/450; 455/452.1; 370/312; 370/331; 370/338; 370/341

(58) Field of Classification Search
USPC ......... 725/109, 62; 455/436–440, 450, 452.1; 370/312, 331, 338, 341
See application file for complete search history.

(56) References Cited

U.S. PATENT DOCUMENTS

| | | | |
|---|---|---|---|
| 7,852,794 B2 * | 12/2010 | Venkatachalam | 370/312 |
| 2008/0175238 A1 * | 7/2008 | Venkatachalam | 370/390 |
| 2009/0207773 A1 | 8/2009 | Feng et al. | |
| 2012/0324091 A9 * | 12/2012 | Raleigh et al. | 709/224 |

OTHER PUBLICATIONS

Gonchigsumlaa et al., Performance Analysis of MBS Handover for Mobile WiMAX, Feb. 19-22, 2012, IEEE, ICACT2012, ISBN 978-89-5519-163-9.*
Park et al., Performance Analysis of Multicast Service Using MBS Region in Mobile WiMAX System, Jan. 27-30, 2013, IEEE, ICACT2013, ISBN 978-89-968650-1-8.*

(Continued)

*Primary Examiner* — Hoang-Vu A Nguyen-Ba
(74) *Attorney, Agent, or Firm* — William Park & Associates Patent Ltd.

(57) ABSTRACT

An apparatus and method for managing variable MBS zones in an MBS server are provided. The method variably sets an MBS zone based on a characteristic where user movement between MBS zones and content preference are changed depending on time and environment, and thereby enables a safer and faster shift of an MBS zone, thus effectively providing high-quality multimedia service in a mobile environment.

16 Claims, 6 Drawing Sheets

(56) References Cited

OTHER PUBLICATIONS

Park et al., A Method to Dynamically Configure the Multicast and Broadcast Service Zone in Mobile WiMAX, Jan. 2011, 2011IEEE, ICTC2011, ISBN 978-1-4577-1268-5.*

Pakzad et al., A New Scheme for Detecting Misbehaving Zone Manager with Collaborative Honesty Neighbours, Jan. 2010, 2010IEEE, ISBN 978-1-4244-6709-9.*

Etemad et al., Multicast and Broadcast Multimedia Services in Mobile WiMAX Networks, Oct. 2009, 2009 IEEE Communications Magazine, 0163-6804.*

Klm et al., Dynamic MBS zone configuration based on contents characteristics, Feb. 19-22, 2012, ICACT2012, ISBN 978-89-5519-163-9.*

Chung et al., Design and Implementation of MBS Server for mobile IPTV service in WiMAX Networks, Jan. 2012, 2012 IEEE, ISBN 978-1-4673-4828-7.*

Ray-Guang Cheng, Kuo-Jui Huang & Jen-Shun Yang, Radio Resource Allocation for Overlapping MBS Zones, IEEE Mobile WiMAX Symposium, 2009, pp. 75-80, Department of Electronic Engineering, National Taiwan University of Science and Technology, Taipei, Taiwan, R.O.C.

Ji Hoon Lee, Taekyoung Kwon, Yanghee Choi & Sangheon Pack, Location Management Area (LMA)-based MBS Handover in Mobile WiMAX Systems, International Conference on COMSWARE, 2008, pp. 1-8, School of Computer Science and Engineering, Seoul National University, Korea.

* cited by examiner

APPARATUS AND METHOD FOR MANAGING VARIABLE MULTICAST AND BROADCAST SERVICE ZONES IN MBS SERVER

CROSS-REFERENCE TO RELATED APPLICATION

This application claims the benefit under 35 U.S.C. §119(a) of a Korean Patent Application No. 10-2012-0073540 on Jul. 5, 2012, the entire disclosure of which is incorporated herein by reference for all purposes.

BACKGROUND

1. Field

The following description relates to technology for managing multicast and broadcast service (MBS) zones, and more particularly, to an apparatus and method for managing variable MBS zones in an MBS server.

2. Description of the Related Art

A mobile Internet protocol television (IPTV) service is technology for increasing the convenience of users based on the mobility and interactive service function of mobile Internet, and has become a main service of the fourth generation (4G) mobile communication system. IPTV service is being researched and developed together with various wireless environment technologies and services.

Mobile IPTV service is a service for providing broadcast service even while moving, and is a service in which broadcast and communication are merged. To this end, in WiMAX and IEEE 802.16, various wireless access technologies are being standardized, and, proposed has been a seamless broadcast service using an MBS zone in details of standardization which are being performed.

The MBS zone fundamentally provides a group of several base stations as the same service zone. In the same MBS zone, multicast parameters are shared, and thus, even though a base station moves, service is provided without having to perform a reset process. The MBS is a specification for transferring data from one data source to a plurality of users, in a mobile network.

According to the MBS, the mobile network provides a point-to-multipoint service that transmits data from one data source to a plurality of users, and thus, network resources are shared, and a network resource use rate increases.

The MBS proposed to date realizes multicast and broadcast of a low-speed message, and moreover, realizes multicast and broadcast of a high-speed multimedia message.

However, in a range to which a broadcast zone is applied, there are many cases in which a user's active region is limited to within an MBS zone, and, in a high-quality multimedia service with the consideration of a mobile environment, there is a limitation in assuring Quality of Service (QoS) with the existing proposed standard.

That is, in setting an MBS zone that provides the existing mobile IPTV service, since a manager sets the MBS zone by using a static method according to an internal constant policy, channels are wasted in an unnecessary zone, and problems such as unnecessary MBS handover, are caused in a constantly moving user environment.

The inefficient management of MBS zones has limitations in the efficient use of channels, and causes ineffective MBS handover due to user movement between MBS zones, causing a decrease in service quality due to handover delay to users. Moreover, since content preference and user movement propensity are not considered, problems such as inefficiency can occur in use of MBS channels.

For this reason, the inventor started to conduct research on technology that, by variably setting an MBS zone based on a characteristic where user movement between MBS zones and content preference are changed depending on time and environment, enables a safer and faster shift of an MBS zone, and thus effectively provides high-quality multimedia service in a mobile environment.

SUMMARY

The following description relates to an apparatus and method for managing variable MBS zones in an MBS server, which variably set an MBS zone based on a characteristic where user movement between MBS zones and content preference are changed depending on time and environment, thus effectively providing high-quality multimedia service in a mobile environment.

The following description also relates to an apparatus and method for managing variable MBS zones in an MBS server, which allocate an optimal MBS channel based on a content use rate to thereby provide a variable MBS zone, and thus increase the efficiency of an MBS channel and prevent unnecessary MBS handover caused to users even in a user service environment using various contents, resulting in the enhancement of service quality in providing the MBS.

In one general aspect, an apparatus for managing variable MBS zones in an MBS server collects content use rates of neighboring base stations adjacent to the specific base station, and manages the variable MBS zones based on the collected content use rates of neighboring base stations adjacent to the specific base station.

In another general aspect, when a handover event is detected, the MBS server collects content use rates of neighboring base stations adjacent to the specific base station, and manages the variable MBS zones based on the collected content use rates of neighboring base stations adjacent to the specific base station.

In another general aspect, when a new MBS request is received, the MBS server collects content use rates of neighboring base stations adjacent to the specific base station, and manages the variable MBS zones based on the collected content use rates of neighboring base stations adjacent to the specific base station.

In another general aspect, when an MBS end request is received, the MBS server collects content use rates of neighboring base stations adjacent to the specific base station, and manages the variable MBS zones based on the collected content use rates of neighboring base stations adjacent to the specific base station.

As described above, by variably setting an MBS zone based on a characteristic where user movement between MBS zones and content preference are changed depending on time and environment, the present invention enables a safer and faster shift of an MBS zone, and thus can effectively provide high-quality multimedia service in a mobile environment.

Moreover, since inefficiency is caused by allocating an MBS channel in the existing static method, by considering both preference time and content preference of a neighboring base station, the present invention enables the efficient use of MBS resources compared to the existing static method.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the present invention will be described in detail such that those of ordinary skill in the art can easily understand and reproduce the present invention through embodiments which will be described below with reference to the accompanying drawings.

In the following description, when the detailed description of a relevant known function or configuration is determined to unnecessarily obscure an important point of the present invention, the detailed description will be omitted.

Terms used herein are terms that have been defined in consideration of functions in embodiments, and the terms that have been defined as described above may be altered according to the intent of a user or operator, or conventional practice, and thus, the terms should be defined on the basis of the entire content of this specification.

Figure 1:
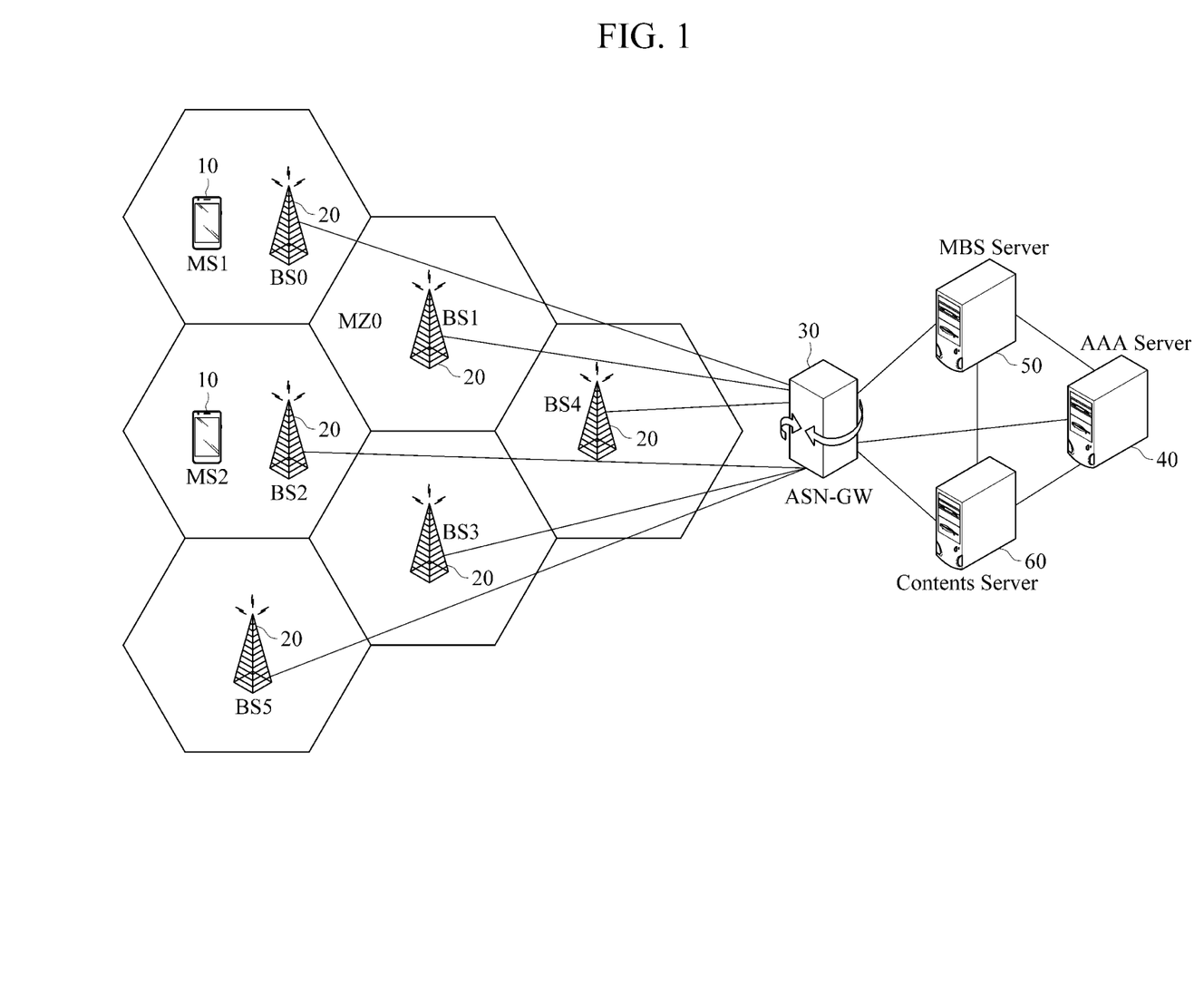
FIG. 1 is a schematic diagram illustrating a mobile WiMAX network.

FIG. 1 is a schematic diagram illustrating a mobile WiMAX network.

Referring to FIG. 1, the mobile WiMAX network includes a plurality of mobile terminals 10 such as smart phones and notebook computers, a plurality of base stations 20 that are access nodes for enabling the mobile terminals 10 to access a mobile network, an access service network gateway (ASN-GW) that acts as an access gateway for an MBS and acts as a router for the MBS and the management of the base stations 20, an authentication authorization account (AAA) server 40 that performs a subscriber and service authentication function, an MBS server 50 that performs setting and management of MBS zones, management of MBS channels, and transmission and management of contents, and a contents server 60 that stores contents.

Figure 2:
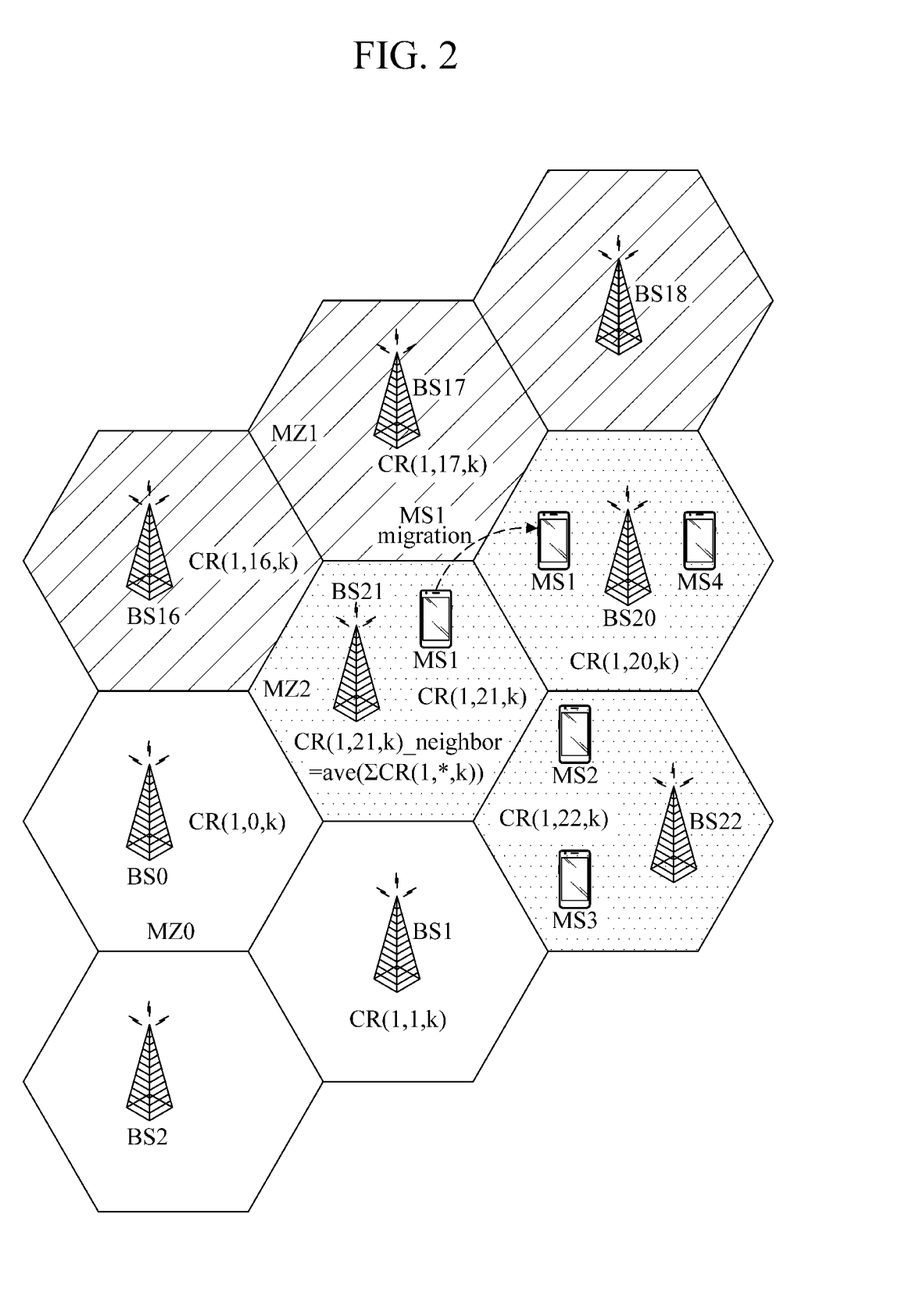
FIG. 2 is a diagram for describing an MBS zone configured with an access service network gateway (ASN-GW).

FIG. 2 is a diagram for describing an MBS zone configured with an access service network gateway (ASN-GW).

Referring to FIG. 2, three MBS zones illustrated as MZ0, MZ1, and MZ2, may be provided. The MBS zone MZ0 includes three base stations respectively illustrated as BS0, BS1, and BS2. The MBS zone MZ1 includes three base stations respectively illustrated as BS16, BS17, and BS18. The MBS zone MZ2 includes three base stations respectively illustrated as BS20, BS21, and BS22.

Unlike the existing MBS zone setting method in which a manager sets an MBS zone by using a static method according to an internal constant policy, the present invention allocates MBS channels in consideration of a content use rate, thereby setting a variable MBS zone. In this case, in consideration of a content use rate, the present invention may variably set an MBS zone according to priority by base station.

Content use rate may be measured by each of base stations at specific intervals, and for example, may be defined as CR(i, j, k). Here, i is a channel index providing contents, j is a base station identifier (ID) for identifying a base station, and k is a time index indicating a content use rate measurement interval and may have an integer value. CR(i, j, k) may be defined as a ratio at which contents used through a channel "i" for a k time occupies a large portion of total contents used by a base station "j"

In FIG. 2, a mobile terminal MS1 uses contents of the base station BS21 through an MBS channel 1. In this case, the base station BS21 measures a content use rate CR(1, 21, k). It is assumed that the base station BS21 provides contents to only the mobile terminal MS1 through the MBS channel 1 at a specific time, and then, after a time elapses, the mobile terminal MS1 moves to the base station BS20. The MBS zone MZ2 includes the base stations BS20 to BS22, and the mobile terminals MS1 to MS4 receive contents through the MBS channel 1.

The present invention manages variable MBS zones based on a content use rate of each of neighboring base stations adjacent to a specific base station.

For example, the present invention may manage the variable MBS zones by using an average value of the content use rates of neighboring base stations adjacent to a specific base station.

A content use rate of a neighboring base station may be expressed as CR(i, j, k)_neighbor. As illustrated in FIG. 2, when the mobile terminal MS1 performs handover from the base station BS21 to the base station BS20, the MBS server may determine whether the continuous maintenance of the MBS channel 1 allocated to the base station BS21 which is not used after handover, is efficient, by using a CR(1, 21, k)_neighbor value which is decided with the content use rates of neighboring base stations adjacent to the base station BS21.

Referring again to FIG. 2, the CR(1, 21, k)_neighbor value may be decided with a content use rate CR(1, 0, k) of the base station BS0, a content use rate CR(1, 1, k) of the base station BS1, a content use rate CR(1, 16, k) of the base station BS16, a content use rate CR(1, 17, k) of the base station BS17, a content use rate CR(1, 20, k) of the base station BS20, and a content use rate CR(1, 22, k) of the base station BS22.

For example, the CR(1, 21, k)_neighbor value may be defined as an average value which is obtained by summing CR(1, 20, k), CR(1, 22, k), CR(1, 1, k), CR(1, 0, k), CR(1, 16, k), and CR(1, 17, k). When the CR(1, 21, k)_neighbor value is large, a use rate of the MBS channel 1 is relatively high, and thus, the MBS channel 1 may not be excluded from a corresponding MBS zone for preventing quality from being degraded due to handover. When the CR(1, 21, k)_neighbor value is less than a service threshold value, other contents may be used by releasing the MBS channel 1.

Figure 3:
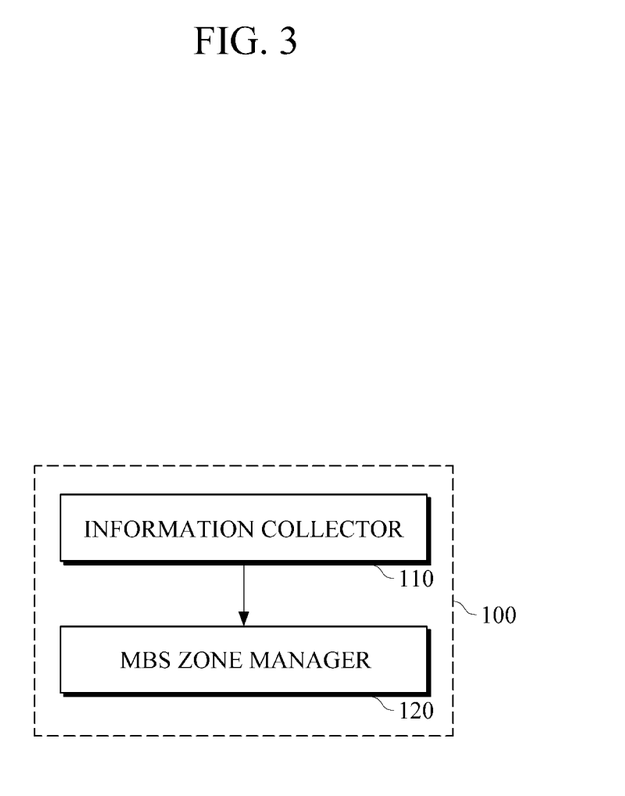
FIG. 3 is a block diagram illustrating a configuration of an embodiment of an apparatus for managing variable MBS zones in an MBS server according to the present invention.

FIG. 3 is a block diagram illustrating a configuration of an embodiment of an apparatus for managing variable MBS zones in an MBS server according to the present invention.

Referring to FIG. 3, an apparatus 100 for managing variable MBS zones according to the embodiment may be implemented in the MBS server, and may include an information collector 110 and an MBS zone manager 120.

The information collector 110 collects content use rates of neighboring base stations adjacent to a specific base station. To this end, the content use rate of each of the base stations may be measured at specific intervals by each base station, and reported to the MBS server. The content use rates of neighboring base stations adjacent to the specific base station have been described above, and thus, a repetitive description is not provided.

To determine whether to continuously maintain an MBS channel allocated to a specific base station, the information collector 110 collects content use rates of neighboring base stations adjacent to a specific base station among content use rates of respective base stations which are measured by the base stations and reported to the MBS server.

The MBS zone manager 120 manages variable MBS zones based on the content use rates of neighboring base stations adjacent to the specific base station.

At this point, the MBS zone manager 120 may manage MBS zones in three cases, namely, a case in which a mobile terminal performs handover from a specific base station to a neighboring base station, a case in which a new MBS is requested from a mobile terminal accessing a specific base station, or a case in which a mobile terminal accessing a specific base station requests the end of the MBS.

First, the following description will be made of an operation in which the MBS zone manager 120 manages MBS zones when a mobile terminal performs handover from a specific base station to a neighboring base station. When a mobile terminal performs handover from a specific base station to a neighboring base station, the MBS zone manager 120 may compare an average value of content use rates of neighboring base stations adjacent to the specific base station and a service threshold value, and, when the average value of content use rates of neighboring base stations adjacent to the specific base station is equal to or greater than the service threshold value, the MBS zone manager 120 may maintain an MBS zone without releasing an MBS channel allocated to the specific base station.

When a mobile terminal performs handover from a specific base station to a neighboring base station, the MBS zone manager 120 may compare an average value of content use rates of neighboring base stations adjacent to the specific base station and the service threshold value, and, when the average value of content use rates of neighboring base stations adjacent to the specific base station is less than the service threshold value, the MBS zone manager 120 may vary an MBS zone without releasing an MBS channel allocated to the specific base station.

According to such implementation, when a mobile terminal is performing handover, the present invention variably sets an MBS zone based on a characteristic in which user movement between MBS zones and content preference are changed depending on time and environment, thus effectively providing high-quality multimedia service in a mobile environment.

Moreover, after a mobile terminal performs handover from a source base station to a target base station, the present invention checks the availability of an MBS channel allocated to the source base station to determine whether to maintain or release the MBS channel allocated to the source base station by using an average value of content use rates of neighboring base stations adjacent to the source base station, and thus can prevent unnecessary MBS handover. Accordingly, the present invention can prevent quality from being degraded due to the MBS handover, thus enhancing service quality in providing the MBS.

The following description will be made of an operation in which the MBS zone manager 120 manages MBS zones when a mobile terminal accessing a specific base station requests a new MBS. When a mobile terminal accessing a specific base station requests a new MBS, the MBS zone manager 120 may compare an average value of content use rates of neighboring base stations adjacent to the specific base station and the service threshold value, and, when the average value of content use rates of neighboring base stations adjacent to the specific base station is equal to or greater than the service threshold value, the MBS zone manager 120 may allocate an MBS channel to the specific base station to vary an MBS zone.

At this point, when the average value of content use rates of neighboring base stations adjacent to the specific base station is equal to or greater than the service threshold value, the MBS zone manager 120 determines whether there is a spare channel, and, when there is a spare channel, the MBS zone manager 120 may allocate the MBS channel to the specific base station. When there is no spare channel, the MBS zone manager 120 may process the unicast access of the mobile terminal.

When a mobile terminal accessing a specific base station requests a new MBS, the MBS zone manager 120 may compare an average value of content use rates of neighboring base stations adjacent to the specific base station and the service threshold value, and, when the average value of content use rates of neighboring base stations adjacent to the specific base station is less than the service threshold value, the MBS zone manager 120 may process the unicast access of the mobile terminal.

According to such implementation, when a mobile terminal accessing a specific base station requests a new MBS, the present invention variably sets an MBS zone based on a characteristic in which user movement between MBS zones and content preference are changed depending on time and environment, thus effectively providing high-quality multimedia service in the mobile environment.

Moreover, since inefficiency is caused by allocating an MBS channel in the existing static method, by considering both a preference time and the content preference of a neighboring base station, the present invention enables the efficient use of MBS resources compared to the existing static method.

The following description will be made of an operation in which the MBS zone manager 120 manages MBS zones when a mobile terminal accessing a specific base station requests the end of the MBS. When a mobile terminal accessing a specific base station requests the end of the MBS, the MBS zone manager 120 may compare an average value of content use rates of neighboring base stations adjacent to the specific base station and the service threshold value, and, when the average value of content use rates of neighboring base stations adjacent to the specific base station is less than the service threshold value, the MBS zone manager 120 may release an MBS channel allocated to the specific base station to vary an MBS zone.

When a mobile terminal accessing a specific base station requests the end of the MBS, the MBS zone manager 120 may determine whether there is another mobile terminal which uses the MBS channel allocated to the specific base station, and, when there is another mobile terminal, the MBS zone manager 120 may maintain an MBS zone without releasing the MBS channel allocated to the specific base station.

According to such implementation, when a mobile terminal accessing a specific base station requests the end of the MBS, the present invention variably sets an MBS zone based on a characteristic in which user movement between MBS zones and content preference are changed depending on time and environment, thus effectively providing high-quality multimedia service in the mobile environment.

Moreover, since inefficiency is caused by allocating an MBS channel in the existing static method, by considering both a preference time and the content preference of a neighboring base station, the present invention enables the efficient use of MBS resources compared to the existing static method.

The following will be made with reference to FIGS. 4 to 6 on an operation in which the MBS server manages MBS zones in three cases, namely, a case in which a mobile terminal performs handover from a specific base station to a neighboring base station, a case in which a new MBS is requested from a mobile terminal accessing a specific base station, or a case in which a mobile terminal accessing a specific base station requests the end of the MBS.

Figure 4:
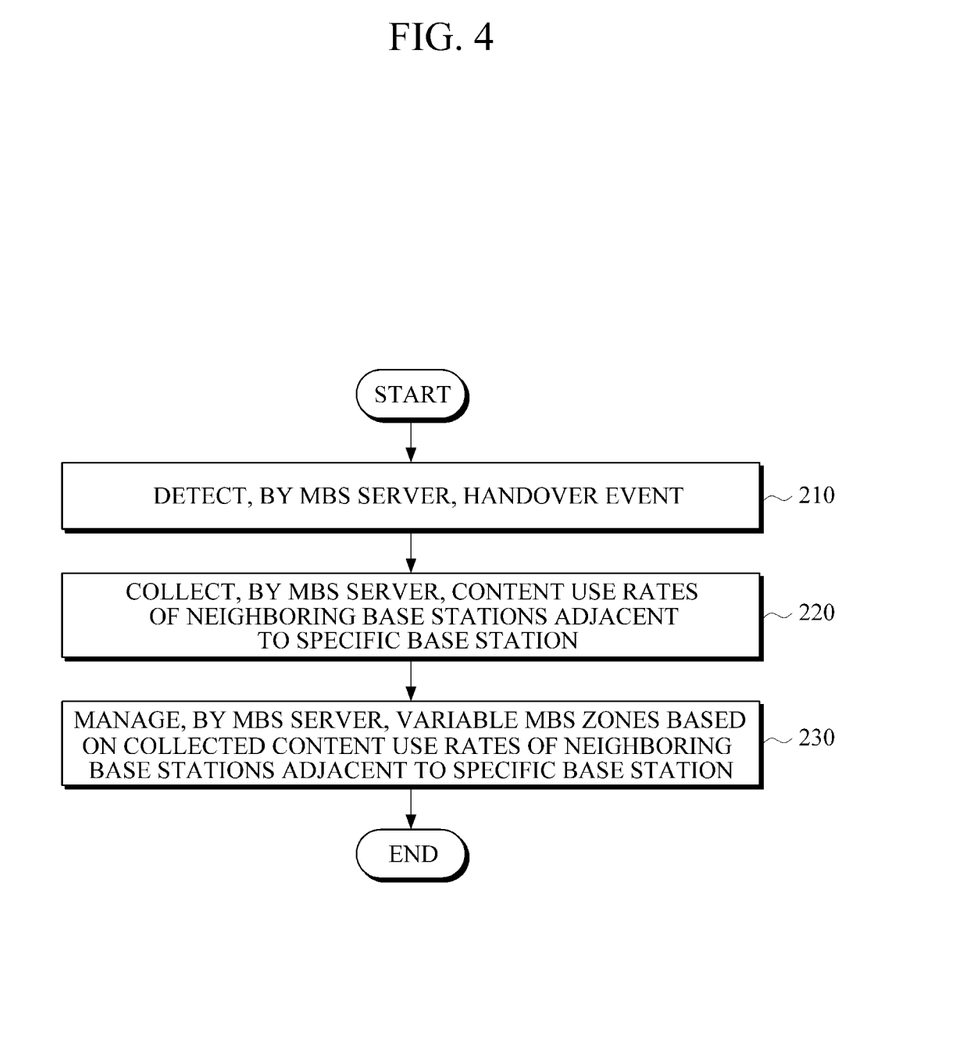
FIG. 4 is a flowchart illustrating an embodiment of a method of managing variable MBS zones in the MBS server according to the present invention.

FIG. 4 is a flowchart illustrating an embodiment of a method of managing variable MBS zones in the MBS server according to the present invention, and illustrates an operation in which the MBS server manages MBS zones when a mobile terminal performs handover from a specific base station to a neighboring base station.

First, in handover detection operation 210, as the mobile terminal moves from the specific base station to the neighboring base station, the MBS server detects a handover event. Technology associated with handover is general technology that is variously disclosed and used before the patent application, and thus, its detailed description is not provided.

When a handover event is detected in handover detection operation 210, the MBS server collects content use rates of neighboring base stations adjacent to a specific base station in information collection operation 220. The collection of the content use rates of the base stations has been described above, and thus, a repetitive description is not provided.

Subsequently, in MBS zone management operation 230, the MBS server manages variable MBS zones based on the content use rates (collected in information collection operation 220) of neighboring base stations adjacent to the specific base station.

At this point, in MBS zone management operation 230, the MBS server may compare an average value of content use rates of the neighboring base stations adjacent to the specific base station and the service threshold value, and, when the average value of content use rates of neighboring base stations adjacent to the specific base station is equal to or greater than the service threshold value, the MBS server may maintain an MBS zone without releasing an MBS channel allocated to the specific base station.

On the other hand, when the average value of content use rates of neighboring base stations adjacent to the specific base station is less than the service threshold value, the MBS server may release the MBS channel allocated to the specific base station to vary the MBS zone.

According to such implementation, when a mobile terminal is performing handover, the MBS server variably sets an MBS zone based on a characteristic in which user movement between MBS zones and content preference are changed depending on time and environment, thus effectively providing high-quality multimedia service in a mobile environment.

Moreover, after a mobile terminal performs handover from a source base station to a target base station, the MBS server checks the availability of an MBS channel allocated to the source base station to determine whether to maintain or release the MBS channel allocated to the source base station by using an average value of content use rates of neighboring base stations adjacent to the source base station, and thus can prevent unnecessary MBS handover. Accordingly, the present invention can prevent quality from being degraded due to the MBS handover, thus enhancing service quality in providing the MBS.

Figure 5:
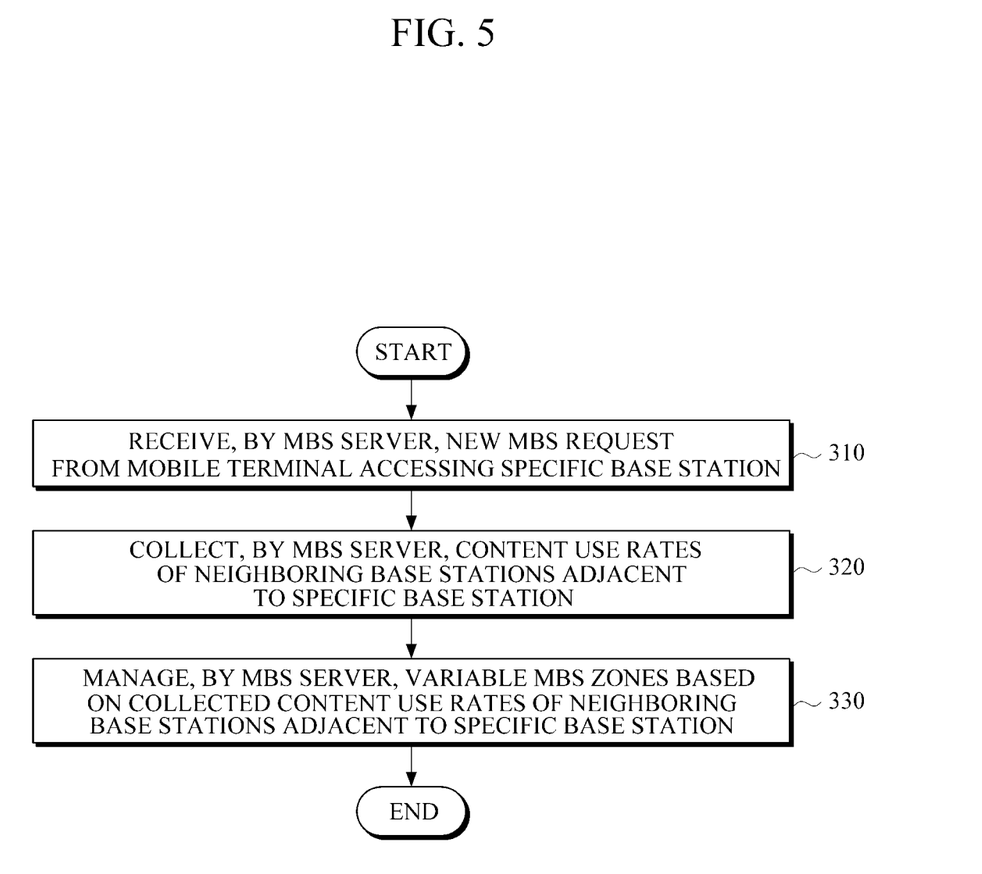
FIG. 5 is a flowchart illustrating another embodiment of the method of managing variable MBS zones in the MBS server according to the present invention.

FIG. 5 is a flowchart illustrating another embodiment of the method of managing variable MBS zones in the MBS server according to the present invention, and illustrates an operation in which the MBS server manages MBS zones when a new MBS is requested from a mobile terminal accessing a specific base station.

First, in service request reception operation 310, the MBS server receives a new MBS request from the mobile terminal accessing the specific base station. Technology for receiving the new MBS request from the mobile terminal accessing the specific base station is general technology that is disclosed and has been used before the patent application, and thus, its detailed description is not provided.

When the new MBS request is received in service request reception operation 310, the MBS server collects content use rates of neighboring base stations adjacent to the specific base station in information collection operation 320. The collection of the content use rates of the base stations has been described above, and thus, a (repetitive) description is not provided.

Subsequently, in MBS zone management operation 330, the MBS server manages variable MBS zones based on the content use rates (collected in information collection operation 320) of neighboring base stations adjacent to the specific base station.

At this point, in MBS zone management operation 330, the MBS server may compare an average value of content use rates of the neighboring base stations adjacent to the specific base station and the service threshold value, and, when the average value of content use rates of neighboring base stations adjacent to the specific base station is equal to or greater than the service threshold value, the MBS server may allocate an MBS channel to the specific base station to vary an MBS zone.

Moreover, in MBS zone management operation 330, when the average value of content use rates of neighboring base stations adjacent to the specific base station is equal to or greater than the service threshold value, the MBS server may determine whether there is a spare channel, and, when there is a spare channel, the MBS server may allocate the MBS channel to the specific base station.

On the other hand, in MBS zone management operation 330, when there is no spare channel, the MBS server may process the unicast access of the mobile terminal. An operation in which the MBS server determines whether there is a space channel is general technology that is disclosed and has been used before the patent application, and thus, its detailed description is not provided.

Moreover, in MBS zone management operation 330, when the average value of content use rates of neighboring base stations adjacent to the specific base station is less than the service threshold value, the MBS server may process the unicast access of the mobile terminal.

According to such implementation, when a mobile terminal accessing a specific base station requests a new MBS, the MBS server variably sets an MBS zone based on a characteristic in which user movement between MBS zones and content preference are changed depending on time and environment, thus effectively providing high-quality multimedia service in the mobile environment.

Moreover, since inefficiency is caused by allocating an MBS channel in the existing static method, by considering both preference time and content preference of a neighboring base station, the present invention enables the efficient use of MBS resources compared to the existing static method.

Figure 6:
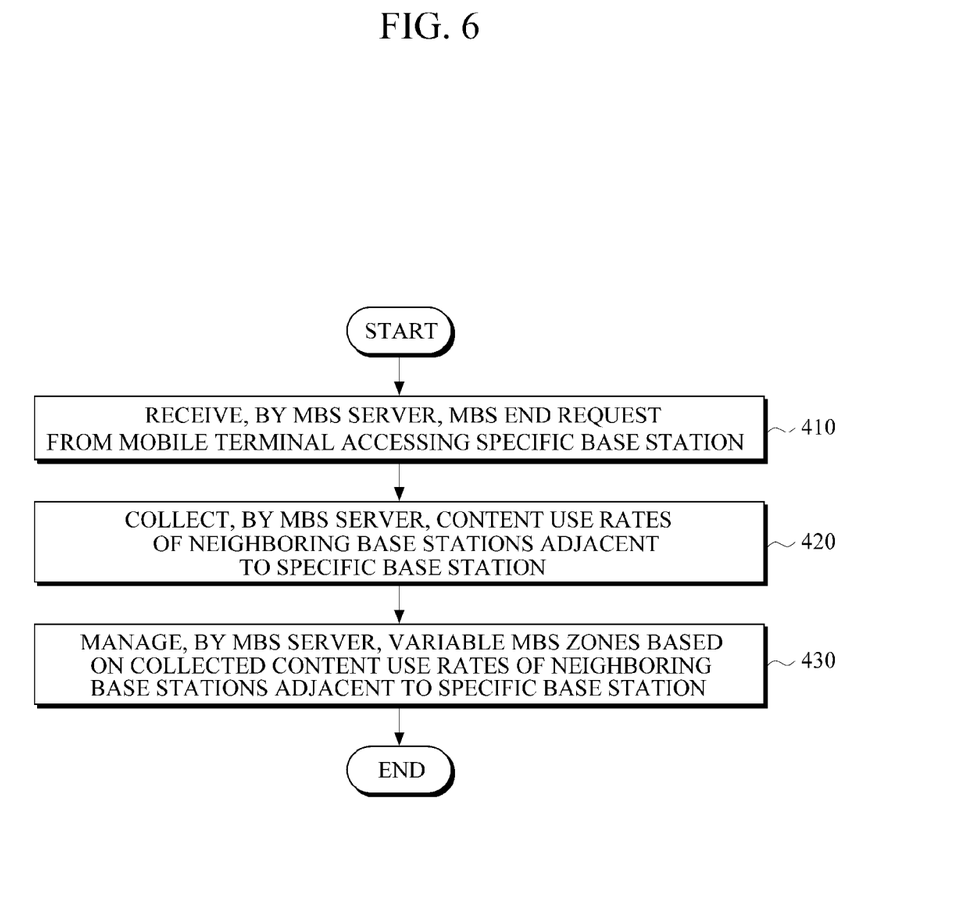
FIG. 6 is a flowchart illustrating another embodiment of the method of managing variable MBS zones in the MBS server according to the present invention.

FIG. 6 is a flowchart illustrating another embodiment of the method of managing variable MBS zones in the MBS server according to the present invention, and illustrates an operation in which the MBS server manages MBS zones when a mobile terminal accessing a specific base station requests the end of the MBS.

First, in service end request reception operation 410, the MBS server receives a service end request from the mobile terminal accessing the specific base station. Technology for receiving the service end request from the mobile terminal accessing the specific base station is general technology that is disclosed and has been used before the patent application, and thus, its detailed description is not provided.

When the service end request is received in service end request reception operation 410, the MBS server collects content use rates of neighboring base stations adjacent to the specific base station in information collection operation 420. The collection of the content use rates of the base stations has been described above, and thus, a repetitive description is not provided.

Subsequently, in MBS zone management operation 430, the MBS server manages variable MBS zones based on the content use rates (collected in information collection operation 420) of neighboring base stations adjacent to the specific base station.

At this point, in MBS zone management operation 430, the MBS server may compare an average value of content use rates of the neighboring base stations adjacent to the specific base station and the service threshold value, and, when the average value of content use rates of neighboring base stations adjacent to the specific base station is less than the service threshold value, the MBS server may release an MBS channel allocated to the specific base station to vary an MBS zone.

Moreover, in MBS zone management operation 430, the MBS server may determine whether there is another mobile terminal which uses the MBS channel allocated to the specific base station, and, when there is another mobile terminal, the MBS server may maintain an MBS zone without releasing the MBS channel allocated to the specific base station.

According to such implementation, when a mobile terminal accessing a specific base station requests the end of the MBS, the present invention variably sets an MBS zone based on a characteristic in which user movement between MBS zones and content preference are changed depending on time and environment, thus effectively providing high-quality multimedia service in the mobile environment.

Moreover, since inefficiency is caused by allocating an MBS channel in the existing static method, by considering both preference time and content preference of a neighboring base station, the present invention enables the efficient use of MBS resources compared to the existing static method.

The present invention can be implemented as computer-readable codes in a computer-readable record medium. A computer-readable record medium includes all types of record media in which computer-readable data is stored. Examples of a computer-readable record medium include a ROM, a RAM, a CD-ROM, a magnetic tape, a floppy disk, and optical data storage. Further, the record medium may be implemented in the form of a carrier wave such as Internet transmission. In addition, the computer-readable record medium may be distributed to computer systems over a network, in which computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus comprising:
an information collector configured to collect content use rates of neighboring base stations adjacent to a specific base station; and
a multicast and broadcast service (MBS) zone manager configured to manage variable MBS zones based on the content use rates of neighboring base stations adjacent to the specific base station;
wherein, when a mobile terminal performs handover from the specific base station to a neighboring base station, the MBS zone manager compares an average value of content use rates of the neighboring base stations adjacent to the specific base station and a content use rate threshold value, and, when the average value of content use rates of neighboring base stations adjacent to the specific base station is equal to or greater than the content use rate threshold value, the MBS zone manager maintains an MBS zone without releasing an MBS channel allocated to the specific base station.

2. The apparatus of claim 1, wherein, when the mobile terminal performs handover from the specific base station to the neighboring base station, the MBS zone manager compares the average value of content use rates of the neighboring base stations adjacent to the specific base station and the content use rate threshold value, and, when the average value of content use rates of neighboring base stations adjacent to the specific base station is less than the content use rate threshold value, the MBS zone manager releases the MBS channel allocated to the specific base station to vary an MBS zone.

3. The apparatus of claim 1, wherein, when a mobile terminal accessing the specific base station requests a new MBS, the MBS zone manager compares an average value of content use rates of the neighboring base stations adjacent to the specific base station and a content use rate threshold value, and, when the average value of content use rates of neighboring base stations adjacent to the specific base station is equal to or greater than the content use rate threshold value, the MBS zone manager allocates an MBS channel to the specific base station to vary the MBS zone.

4. The apparatus of claim 1, wherein, when a mobile terminal accessing the specific base station requests a new MBS, the MBS zone manager compares an average value of content use rates of the neighboring base stations adjacent to the specific base station and a content use rate threshold value, and, when the average value of content use rates of neighboring base stations adjacent to the specific base station is less than the content use rate threshold value, the MBS zone manager processes unicast access of the mobile terminal.

5. The apparatus of claim 1, wherein, when a mobile terminal accessing the specific base station requests a new MBS, and, when an average value of content use rates of neighboring base stations adjacent to the specific base station is equal to or greater than the content use rate threshold value, the MBS zone manager determines whether a spare channel is present, and, when a spare channel is present, the MBS zone manager allocates an MBS channel to the specific base station.

6. The apparatus of claim 5, wherein, when no spare channel is present, the MBS zone manager processes unicast access of the mobile terminal.

7. The apparatus of claim 1, wherein, when a mobile terminal accessing the specific base station requests end of a multicast and broadcast service, the MBS zone manager compares an average value of content use rates of the neighboring base stations adjacent to the specific base station and a content use rate threshold value, and, when the average value of content use rates of neighboring base stations adjacent to the specific base station is less than the content use rate threshold value, the MBS zone manager releases an MBS channel allocated to the specific base station to vary the MBS zone.

8. The apparatus of claim 1, wherein, when a mobile terminal accessing the specific base station requests an end of a multicast and broadcast service, the MBS zone manager determines whether another mobile terminal uses an MBS channel allocated to the specific base station, and, when another mobile terminal uses the MBS channel, the MBS zone manager maintains the MBS zone without releasing the MBS channel allocated to the specific base station.

9. A method comprising:
  detecting, by a multicast and broadcast service (MBS) server, a handover event as a mobile terminal moves from a specific base station to a neighboring base station;
  collecting, by the MBS server, content use rates of neighboring base stations adjacent to the specific base station when the handover event is detected; and
  in response to the collecting, managing, by the MBS server, variable MBS zones based on the content use rates of neighboring base stations adjacent to the specific base station, wherein the managing comprises comparing an average value of content use rates of the neighboring base stations adjacent to the specific base station and a content use rate threshold value, and, when the average value of content use rates of neighboring base stations adjacent to the specific base station is equal to or greater than the content use rate threshold value, the MBS server maintains an MBS zone without releasing an MBS channel allocated to the specific base station.

10. The method of claim 9, wherein, when the average value of content use rates of neighboring base stations adjacent to the specific base station is less than the content use rate threshold value, the MBS server releases the MBS channel allocated to the specific base station to vary the MBS zone.

11. A method comprising:
  receiving, by a multicast and broadcast service (MBS) server, a new MBS request from a mobile terminal accessing a specific base station;
  collecting, by the MBS server, content use rates of neighboring base stations adjacent to the specific base station when the new MBS request is received; and
  in response to the collecting, managing, by the MBS server, variable MBS zones based on the content use rates of neighboring base stations adjacent to the specific base station, wherein the managing comprises comparing an average value of content use rates of the neighboring base stations adjacent to the specific base station and a content use rate threshold value, and, when the average value of content use rates of neighboring base stations adjacent to the specific base station is equal to or greater than the content use rate threshold value, the MBS server allocating an MBS channel to the specific base station to vary the an MBS zone.

12. The method of claim 11, wherein, when the average value of content use rates of neighboring base stations adjacent to the specific base station is less than the content use rate threshold value, the MBS server processes unicast access of the mobile terminal.

13. The method of claim 11, wherein, when the average value of content use rates of neighboring base stations adjacent to the specific base station is equal to or greater than the content use rate threshold value, the MBS server determines whether a spare channel is present, and, when a spare channel is present, the MBS server allocates the MBS channel to the specific base station.

14. The method of claim 13, wherein, when no spare channel is present, the MBS server processes unicast access of the mobile terminal.

15. A method comprising:
  receiving, by a multicast and broadcast service (MBS) server, an MBS end request from a mobile terminal accessing a specific base station;
  collecting, by the MBS server, content use rates of neighboring base stations adjacent to the specific base station when the MBS end request is received; and
  in response to the collecting, managing, by the MBS server, variable MBS zones based on the content use rates of neighboring base stations adjacent to the specific base station, wherein the managing comprises comparing an average value of content use rates of the neighboring base stations adjacent to the specific base station and a content use rate threshold value, and, when the average value of content use rates of neighboring base stations adjacent to the specific base station is less than the content use rate threshold value, and releasing an MBS channel allocated to the specific base station to vary an MBS zone.

16. The method of claim 15, wherein the managing comprises determining whether another mobile terminal uses the MBS channel allocated to the specific base station, and, when another mobile terminal uses the MBS channel, maintaining an MBS zone without releasing the MBS channel allocated to the specific base station.

* * * * *